(12) United States Patent
Buter et al.

(10) Patent No.: US 6,605,668 B2
(45) Date of Patent: *Aug. 12, 2003

(54) WATER-DISSIPATABLE POLYMERS AND THEIR USE IN AQUEOUS SYSTEMS

(75) Inventors: Roelof Buter, Dieren (NL); Andreas Henricus Johannes Roelofs, Arnhem (NL)

(73) Assignee: Akzo Nobel N.V., Arnhem (NL)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/567,950

(22) Filed: May 10, 2000

(65) Prior Publication Data

US 2002/0193512 A1 Dec. 19, 2002

Related U.S. Application Data

(63) Continuation of application No. 09/082,227, filed on May 20, 1998, now abandoned, which is a continuation of application No. PCT/EP96/05157, filed on Nov. 21, 1996.

(30) Foreign Application Priority Data

Nov. 21, 1995 (EP) ............................. 95203197

(51) Int. Cl.$^7$ ........................... C08L 75/00; C08L 51/00
(52) U.S. Cl. ..................... 524/814; 524/504; 524/558; 524/591; 524/839
(58) Field of Search ............................. 524/591, 504, 524/558, 814, 839

(56) References Cited

U.S. PATENT DOCUMENTS

| | | | |
|---|---|---|---|
| 3,804,481 A | 4/1974 | Tillman | 312/214 |
| 4,108,814 A | 8/1978 | Reiff et al. | 260/29.2 |
| 4,147,679 A * | 4/1979 | Scriven et al. | |
| 4,309,327 A * | 1/1982 | Ishikura et al. | |
| 4,373,056 A | 2/1983 | Besecke et al. | 524/547 |
| 4,379,872 A | 4/1983 | Ishikura et al. | 523/406 |
| 4,530,946 A * | 7/1985 | Kanda et al. | |
| 4,605,640 A | 8/1986 | Fanta et al. | 502/402 |
| 4,973,656 A | 11/1990 | Blount | 528/272 |
| 5,075,370 A | 12/1991 | Kubitza et al. | 524/591 |
| 5,242,751 A * | 9/1993 | Hartman | |
| 5,243,008 A | 9/1993 | Ahmed et al. | 527/309 |
| 5,331,039 A | 7/1994 | Blum et al. | 524/507 |
| 5,336,711 A | 8/1994 | Schneider et al. | 524/507 |
| 5,344,873 A | 9/1994 | Blum | 524/591 |

FOREIGN PATENT DOCUMENTS

| | | | |
|---|---|---|---|
| EP | 048 320 | 3/1982 | |
| EP | 358 979 A2 | 3/1990 | ........... C08G/18/62 |
| EP | 358 979 A3 | 3/1990 | ........... C08G/18/62 |
| EP | 0511520 | 11/1992 | |
| WO | WO 92/07010 | 4/1992 | |
| WO | WO 93/06184 | 4/1993 | |
| WO | WO 94/28043 | 12/1994 | ........... C08G/18/08 |

OTHER PUBLICATIONS

Clark, A. C., "New & Improved Waterborne Systems," Adhesives Age, Sep. 1999, 4 pages.

* cited by examiner

Primary Examiner—Tae H. Yoon
(74) Attorney, Agent, or Firm—Joan M. McGillycuddy

(57) ABSTRACT

The invention pertains to water-dissipatable polymers comprising lipophilic polymers having pendant sulfonic acid salt groups and, optionally, pendant nonionic groups, methods of making such water-dissipatable polymers and the use of such polymers in aqueous systems, including aqueous coating compositions. The invention also pertains to addition polymer polyols having such pendant sulfonic acid salt groups and, optionally, pendant nonionic groups, their methods of manufacture and their use in aqueous systems, including aqueous coating compositions. The polymers of the invention may be used as, for example, binders, emulsifying agents and dispersing agents in aqueous systems, especially aqueous coating compositions.

16 Claims, No Drawings

WATER-DISSIPATABLE POLYMERS AND THEIR USE IN AQUEOUS SYSTEMS

CROSS REFERENCE TO RELATED APPLICATION

The present application is a continuation of U.S. Ser. No. 09/082,227 filed on May 20, 1998, now abandoned, which is a continuation of International Application PCT/EP96/05157 filed on Nov. 21, 1996.

BACKGROUND OF THE INVENTION

1. Field of the Invention

The invention relates to water-dissipatable, lipophilic polymers comprising pendant sulfonic acid salt groups, methods of making such water-dissipatable polymers and the use of such polymers in aqueous systems, including aqueous coating compositions.

2. Related Art

As used herein, "water-dissipatable", "dissipated in water", and other grammatical forms of such terms are meant to include all forms of one or more substances in water; that is, a solution and/or a colloidal system, including but not limited to solutions, dispersions, suspensions, emulsions, etc.

As used herein, "lipophilic polymers" means polymers that are non-dissipatable, or substantially non-dissipatable in water. The polymer, however, may contain components, or be the polymerization product of monomers, which in and of themselves are water-dissipatable, as long as the polymer is not. Further, the term "polymer" is intended to include oligomers unless otherwise stated. Any "lipopholic polymer" is contemplated herein; however, in general, the lipophilic polymer possess an Mn in the range of about 300 to about 100,000, more preferably about 1000 to about 50,000 and especially about 1000 to about 20,000.

As used herein, "aqueous system" means a system wherein one or more substances are dissipated in water.

Organic carriers, solvents, emulsifiers, dispersing agents, etc. have historically been used to dissipate generally lipophilic polymers (sometimes also referred to as "resins") in coatings, adhesives, sealants, film forming products, etc. The desire to reduce the use of the above-mentioned organic carriers, solvents, etc. in polymer systems has lead to the search for alternatives. One of those is using water as the carrier for polymers ultimately dried, cured and/or reacted with other components to produce coatings, adhesives, sealants, etc. As noted, for example, in WO-A-92/07010, various options have been pursued to dissipate in water otherwise water-incompatible lipophilic polymers in order to form stable aqueous systems.

EP-A-543228 (U.S. Pat. No. 5,336,711) discloses, in part, an aqueous binder composition wherein a polyisocyanate component is emulsified in an aqueous solution or dispersion of water-dilutable organic polyols containing at least one polyester resin having carboxylate and hydroxyl groups and grafted with vinyl monomers. That patent publication also teaches preparation of carboxylate groups by at least partially neutralizing carboxyl groups with a base, preferably ammonia or dimethyl ethanol amine. However, if such aqueous organic polyol systems are used with polyisoyanates the presence of organic amines can catalyze the undesired reaction between water and isocyanate. This produces carbon dioxide which can foam, leading to undesirable effects, such as imperfections in a coating layer. Aqueous organic polyol systems requiring little or no organic amine are therefore desirable. Further, if such aqueous organic polyol systems are used in coating compositions comprising aminoplasts, such organic amines can retard the curing reaction of the polyol and the aminoplast.

Aqueous systems of organic polyols having sulfonate groups are generally known from, for example, EP-A-537568 (U.S. Pat. No. 5,344,873) and EP-A-542105 (U.S. Pat. No. 5,331,039). EP-A-537568 discloses generally an aqueous binder composition containing (A) an aqueous solution or dispersion of a water-dilutable organic polyol component containing at least one water-dilutable polyester resin requiring, among other things, 4 to 70 milliequivalent sulfonate groups per 100 g polyester resin, and (B) a polyisocyanate component emulsified in the aqueous solution or dispersion (A). EP-A-537568 prefers sulfonate groups that are obtained from aromatic sulfocarboxylic acids having a molecular weight of 224 to 360. Also among the sulfonate groups specifically mentioned as suitable synthesis components are sulfonate diols such as those described in DE-OS-2 446 440 (U.S. Pat. No. 4,108,814). However, the sulfonate diols disclosed there are difficult to prepare.

Difunctional monomers containing a —SO$_3$M group attached to an aromatic nucleus wherein M is hydrogen or a metal ion are known from U.S. Pat. No. 4,973,656. Use in polyester water-dissipated resins is also disclosed. There is, however, little flexibility in the configuration of the compounds disclosed in U.S. Pat. No. 4,973,656, and thus insufficient capability to adapt the compounds to various systems and situations.

EP-A-542105 may be summarized as disclosing a water-based binder composition wherein a polyisocyanate component is emulsified in an aqueous solution or dispersion of a water-dilutable organic polyol component which is a mixture of at least 5 wt. % of each of at least two hydroxy-functional polymers selected from a group of five classes or types of resins, designated as A1 through A5 in EP-A-542105. Among the hydroxy-functional polymers possible in A1 through A5 are polyester resins having sulfonate groups (A3 and A4) and acrylate-grafted polyester resins having sulfonate groups (A5). In addition to the inconvenience and cost of preparing and/or obtaining two polyols, the binder compositions of EP-A-542105 also risk incompatibility and/or colloidal instability due to the presence of two of the polyols mentioned in that publication.

Consequently, the search for water-dissipatable polymers are sought which overcome these and other problems found with current technology.

SUMMARY OF THE INVENTION

In one embodiment, the current invention relates to lipophilic polymers having pendant sulfonic acid salt groups of the following formula (Formula 1)

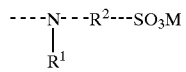

wherein
R$^1$ is selected from the group (a) hydrogen, (b) C$_1$ to C$_{20}$ alkyl, (c) substituted C$_1$ to C$_{20}$ alkyl and (d) the following formula (Formula 2)

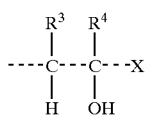

wherein $R^3$ and $R^4$ are independently selected from the group hydrogen and methyl, and X is the residue of a monoepoxy-containing compound, $R^2$ is selected from the group $C_1$ to $C_6$ alkylene and $C_1$ to $C_6$ substituted alkylene, and M is a cation.

In a specific variation of this embodiment the lipophilic polymers further comprise pendant $C_1$ to $C_4$ alkoxy polyalkoxy alkylene groups.

In a preferred embodiment of the current invention the lipophilic polymer is a polyol, preferably an addition polymer polyol.

Another embodiment of the current invention comprises an at least partially unsaturated polymer to which has been grafted an addition polymer of the above-described type.

The invention also comprises methods of preparing the above-described polymers.

The invention further comprises aqueous systems, and in particular aqueous coating compositions comprising the above-described polymers wherein the polymers serve as binders, emulsifying agents and/or dispersing agents.

DETAILED DESCRIPTION OF THE INVENTION

According to the present invention, the "lipophilic polymer" may be based upon any number of the well-known variety of polymer systems. As examples thereof may be mentioned polyesters and alkyds, polyepoxyesters, polyethers, polyurethanes, cellulose-based polymers, polycarbonates, polyacrylates, polyvinyls, polyamides, polyacetals, etc.

Preferably, the polymers contain essentially ester and/or addition polymer linkages such as, for example, polyesters (including alkyds), polyepoxyesters and polymers produced via free-radical addition polymerization. These preferred polymers may also contain minor amounts of other types of linkages such as, for example, urethane (e.g., from chain extension of a polyol with a diisocyanate), ether (e.g., chain extension of a polyol with a diepoxide) and others well-known to those skilled in the relevant art. Further, if the lipophilic polymers are grafted with an addition polymer comprising sulfonic acid salt groups, the lipophilic polymer must be at least partially unsaturated to enable grafting of the addition polymer. The compositions of a number of suitable lipophilic polymers are also discussed in further detail below.

As noted above, addition polymers according to the current invention are a preferred embodiment; more particularly, addition polymer polyols. Addition polymer polyols, in general; that is, polyols formed by addition polymerization of monomers, are well-known to those skilled in the art and need not be described in detail here. All such addition polymers are suitable for use in the current invention. Non-limiting examples of free-radically polymerizable monomers suitable for producing addition polymers of the invention are (cyclo)alkyl (meth)acrylates having one to about 12, preferably about 1 to about 6, carbon atoms in the (cyclo)alkyl group, such as methyl (meth)acrylate, ethyl (meth)acrylate, propyl (meth)acrylate, isopropyl (meth) acrylate, butyl (meth)acrylate, 2-ethylhexyl (meth)acrylate, octyl (meth)acrylate, isobornyl (meth)acrylate, dodecyl (meth)acrylate and cyclohexyl (meth)acrylate; (cyclo)alkyl esters of dicarboxylic acids with one to about 12, preferably about 1 to about 6 carbon atoms in the (cyclo)alkyl groups, such as dimethyl maleate and diethyl maleate; alkoxy polyalkoxy alkylene (meth)acrylates, such as methoxy polyethylene glycol (meth)acrylates (also referred to as "MPEG (meth)acrylates", typically having a molecular weight from about 300 to about 2000); other (meth)acrylates with ether groups, such as 2-methoxy-ethyl methacrylate, 2-ethoxy-ethyl methacrylate and 3-methoxy-propyl (meth)acrylate; hydroxyalkyl (meth)acrylates, such as 2-hydroxy ethyl (meth)acrylate, 2-hydroxy propyl (meth)acrylate, 4-hydroxy butyl acrylate, 6-hydroxy hexyl acrylate, p-hydroxy polypropylene glycol (meth)acrylate, and alkoxy derivatives thereof; monovinyl aromatic compounds, such as styrene, vinyl toluene, α-methyl styrene and vinyl napthalene; other substituted (meth)acrylic compounds such as (meth)acrylamide, (meth)acrylonitrile, N-methylol (meth)acrylamide and N-alkyl (meth)acrylamides; other mono unsaturated compounds such vinyl chloride, vinyl acetate, vinyl propionate and vinyl pyrrolidone; and unsaturated monoepoxides, such as glycidyl (meth)acrylate and glycidyl allyl ether.

Monomers suitable for providing pendant sulfonic acid salt groups of Formula 1 generally are free-radically polymerizable monomers having at least one terminal group of Formula 1. Non-limiting examples of such monomers are styrene sulfonic acid, 2-acrylamido-2-methyl-propane sulfonic acid, amino ethane sulfonic acid and the salts of such acids, and sodium dodecyl allyl sulfosucciante. Other examples of these monomers are monomers which are the reaction product of (a) free-radically polymerizable monomers having an isocyanate group, for non-limiting example, dimethyl-m-isopropenyl benzyl isocyanate, and isocyanato-ethyl methacrylate, and (b) alkali metal taurinates (in particular, sodium taurinate), salts of N-(alkyl)taurinates (especially the sodium salts thereof), and adducts comprising the reaction product of monoepoxy-containing compounds and alkali metal taurinates, in particular sodium taurinates. Regarding such adducts, reference is made to Formula 2 above. "X" in Formula 2 is determined by the monoepoxy-containing compound selected to react with alkali metal taurinates. Examples of such compounds are given below.

In principle, any monoepoxy-containing compound is suitable for preparation of the above-described adduct of taurinate and monoepoxy-containing compound. Particularly suitable epoxy-containing compounds are mono glycidyl ethers, such as alkyl glycidyl ethers, for example, butyl glycidyl ether and 2-ethylhexyl glycidyl ether; mono glycidyl esters, including glycidyl esters of carboxylic acids, for example, glycidyl esters of α, α-dimethyl octanoic acid (available under the trademark Cardura® E from Shell Chemical Corporation, Houston, Tex., the glycidyl ester of Versatic acid (available as Cardura® E-10 from Shell Chemical Corporation, Houston, Tex.), etc. In one method of preparing such adducts the reactants are brought together in mixtures of water and organic solvent, preferably, water-miscible solvents, for non-limiting example, the water-miscible solvents mentioned below for addition polymerization, and particularly, methoxy ethanol, methoxy propanol and ethanol. The ratio of monoepoxy-containing compound to the monomer supplying sulfonic acid or sulfonic acid salt depends on the polymer to which the adduct is ultimately attached and the use made of that polymer (e.g., reactive polyol, emulsifier, dispersing agent, etc.). However, generally, a suitable ratio is about 0.8 to 1.6, preferably about 1 to about 1.4.

Pendant, nonionic stabilizing moieties can be provided by copolymerization with other monomers during polymer formation. For example, such pendant nonionic groups may be provided to addition polymers by monomers comprising both unsaturated groups capable of addition polymerization and one or more nonionic groups, such as alkoxy polyalkoxy alkylene (meth)acrylate, preferably the so-called "MPEG-(meth)acrylates" in molecular weight ranges of about 350 to about 2000. Other nonionic monomers which may be copolymerized during addition polymerization are the reaction products of dimethyl-m-isopropenyl benzyl isocyanate and either polyether amines or adducts which are the reaction product of polyether amine and a monoepoxide. Polyether amines (also referred to as alkoxy polyalkoxy alkylene monoamines) can be prepared by polymerization of monoalcohol with ethylene oxide (EO), propylene oxide (PO) or mixtures of EO and PO. The polymerization is carried out in the presence of an initiator such as methanol. After polymerization the end-group is converted to an amine by conventional methods. Polyether amines are commercially available as Jeffamine® M from Huntsman Corporation, Zaventem, Belgium.

Pendant nonionic groups may also be provided by grafting onto an already formed polymer backbone via appropriate reactive groups before, simultaneously, or after modification with the sulfonate adduct. The already discussed polyether amines and their adducts prepared from the reaction product of polyther amine and a monoepoxide are perferably used.

Methods for preparing addition polymers, and in particular addition polymer polyols, are well-known to the skilled artisan. Accordingly such polymerization need not be described in detail here but will be discussed in general terms.

Addition polymerization reactions are usually carried out under inert atmosphere (e.g., nitrogen). Polymerization temperatures are generally from about 60° C. to about 200° C., preferably about 100° C. to about 160° C. at atmospheric pressure. Reaction at elevated pressure (typically about 1.5 to about 10 bar) is also possible. The reaction is also conducted in the presence of a radical initiator. A nonlimiting list of suitable radical initiators includes dibenzoyl peroxide, dicumyl peroxide, t-butyl-2-ethyl hexanoate, t-butyl perbenzoate, t-butyl cumyl peroxide, methyl ethyl ketone peroxide, di-t-butyl peroxy-3,5,5-trimethyl cyclohexane, di-t-butyl peroxide, 1,3-bis(t-butyl)peroxy isopropyl benzene and mixtures thereof. The radical initiators are typically used in amounts from about 0.05 wt. % to about 10 wt. %, perferably from about 1 wt. % to about 5 wt. %, based on the weight of the monomer mixture. Optionally, chain regulators may be used, such as for non-limiting example, n-octyl mercaptan, dodecyl mercaptan and alkyl mercapto propionates, such as butyl mercapto propionate.

Addition polymerization reactions preferably take place in about 5 to about 30 wt. % organic solvent, preferably water-miscible organic solvent. Non-limiting examples are glycol ethers and propylene glycol ether, such as methoxy propanol, butyoxy ethanol, isopropoxy propanol, n-propoxy propanol, diethylene glycol mono-and di-methyl ether and dipropylene glycol mono-and di-methyl ether. Small amounts (e.g., less than about 10–20 wt. %) non-water-miscible organic solvents may also be used. Larger amounts of non-water-miscible solvents may also be used but they typically require removal, e.g. by standard distillation techniques.

Various processes can be used to carry out addition polymerization. For non-limiting example, one homogeneous monomer mixture can be reacted, the monomers and/or monomer mixtures can be sequentially dosed and reacted, some or all monomers can be continuously introduced while varying the concentration of such monomers (see generally, for example, the process disclosed in U.S. Pat. No. 3,804,481), etc.

In one embodiment of the current invention, an addition polymer comprising sulfonate adducts and optionally nonionic adducts are grafted to an at least partially unsaturated polymer, preferably an at least partially unsaturated polyester. However, other at least partially unsaturated polymers can be used, for non-limiting example, polyepoxyester, polyether, polyurethane, etc. and mixtures thereof. In a preferred embodiment, the at least partially unsaturated polymers are polymer polyols. In a particularly preferred embodiment, the at least partially unsaturated polymer is a polyester polyol.

The preparation of polyols, and especially polyester polyols, is well-known (see, for example, *Surface Coatings,* S. Paul, John Wiley & Sons, 1985) and need not be described in detail here. Generally, polyester can be prepared from aliphatic, cycloaliphatic or aromatic monocarboxylic acids, for non-limiting example, benzoic acid, t-butyl benzoic acid, saturated fatty acids (such as isononanoic acid), 2-ethyl hexanoic acid, unsaturated fatty acids (such as soya fatty acid, dehydrated castor oil fatty acid, sorbic acid, etc.) and mixtures; polycarboxylic acids, their esters and anydrides, for non-limiting example, hexahydrophthalic acid, isophthalic acid, phthalic acid, maleic acid, terephthalic acid, itaconic acid, adipic acid, dimer fatty acids, trimellitic acid, pyromellitic acid and mixtures; aliphatic, cycloaliphatic or araliphatic monofunctional alcohols, for nonlimiting example, decanol, n-hexanol, cyclohexanol and mixtures; hydroxy carboxylic acids, for non-limiting example, dimethylol propionic acid, castor oil fatty acid, hydroxy caproic acid and mixtures; and polyols, for non- limiting example, ethylene glycol, propane diol-1,2, neopentyl glycol, butane diol, trimethylol propane, trimethylol ethane, 1,4-cyclohexane dimethanol, glycerol, pentaerythritol, di-trimethylol propane, di-pentaerythritol and mixtures.

Polyesters useful in the current invention can be prepared by well-known processes, for non-limiting example, the melt process or the azeotropic process. If necessary or desirable, a catalyst can be employed. Reaction temperature is typically about 150° C. to about 250° C. If transesterification is involved, produced alcohol is typically removed (e.g., methanol when dimethyl terephthalate is employed).

An unsaturated site for grafting can be provided, in principle, by any copolymerizable monomer having unsaturation. Particularly preferred unsaturated monomers are maleic anhydride, itaconic acid and unsaturated fatty acids, in particular, conjugated unsaturated fatty acids. Unsaturation may also be provided after polymer formation by an unsaturated monoisocyanate, for non-limiting example, dimethyl-m-isopropenylbenzyl isocyanate. A polyester polyol grafted with an addition polyol can be prepared by free-radical addition polymerization in the presence of an at least partly unsaturated polyol. The free-radical addition polymerization can be carried out according to the methods described above.

A polymer of the current invention comprising pendant sulfonic acid salt groups, and optionally pendant nonionic groups, is readily dissipatable in an aqueous medium by conventional means, e.g. stirring, high shear, etc. If the polymer is an organic polyol, it is preferably dissipated at temperatures between about 50° C. and about 100° C. Typically, an aqueous dispersion made according to the current invention comprises a solids content of from about 30 wt. % to about 60 wt. %, preferably from about 35 wt. % to about 55 wt. %.

Sulfonic acid salt groups of the current invention need to be present in amounts sufficient to render the lipophilic polymer water-dissipatable. The amount of sulfonic acid salt groups necessary will vary with the type of lipophilic polymer, but is readily determined by a skilled artisan based on the hydrophobic character of the polymer and the further teachings found herein.

One preferred embodiment of the current invention is an addition polymer polyol which comprises pendant sulfonic acid salt groups, perferably about 0.01 to about 0.4 meq/g sulfonic acid salt groups, most preferably about 0.07 to about 0.25 meq/g and, optionally, nonionic stabilizing groups, the nonionic stabilizing groups preferably 0.01 to about 10 wt. %, most preferably about 0.5 to about 3 wt. % of the polyol. Such an addition polymer polyol typically has a molecular weight of about 100 to about 50,000 preferably about 100 to about 40,000, more preferably about 1000 to about 20,000, most preferably, about 1000 to about 10,000 and an OH number of about 20 to about 300. The nonionic stabilizing groups are typically alkoxy polyalkoxy alkylene groups, preferably having 1 to 4 carbon atoms per group.

Another perferred embodiment comprises an organic polyol comprising an at least partially unsaturated polyol having a molecular weight of about 300 to about 3000, an OH number of about 20 to about 300 and an acid number of less than 5 which has been grafted with an addition polymer polyol having an molecular weight of about 1000 to about 50,000 preferably about 100 to about 40,000, more preferably about 1000 to about 20,000, most preferably about 1000 to about 10,000 and an OH number of about 20 to 300. The organic polyol further comprises about 0.01 to about 0.4 meq/g sulfonic acid salt groups, most preferably about 0.01 to about 0.25 meq/g and, optionally nonionic stabilizing groups, the nonionic stabilizing groups preferably being 0.1 to about 10 wt. %, most preferably about 0.5 to about 3 wt. % (based on solids) of the organic polyol. The nonionic stabilizing groups are typically alkoxy polyalkoxy alkylene groups, preferably having 1 to 4 carbon atoms per group.

A preferred use of aqueous systems according to the current invention is in coating compositions. One particularly preferred coating composition comprises a polyol according to the instant invention and a curing agent for the hydroxyl groups of the polyol. Such hydroxyl-reactive curing agents are well-known in the art and need not be fully described here. Preferred classes of hydroxyl-reactive curing agents are N-methylol-containing aminoplasts, N-methylol ether-containing aminoplasts and polyisocyanates, more particularly, water-dispersible isocyanates and blocked isocyanates (blocked, e.g., with methyl ethyl ketoxime.)

Particularly preferred aminoplasts are methylol melamines comprising about 4 to about 6 methylol groups per molecule, wherein at least about 3 of the methylol groups have been etherified with methanol, butanol and/or a methanol or butanol condensation product of formaldehyde and N,N'-ethylene diurea. The preferred ratio of hydroxyl groups provided by the polyol to hydroxyl-reactive groups in the aminoplast is about 0.7 to about 1.5.

Water-dispersable polyisocyanates are well-known and need not be described here in detail. Water-dispersible polyisocyanates particularly suitable for use in the current invention include, but are not limited to tolylene diisocyanate (TDI), 4,4'-diphenylmethane diisocyanate (MDI), hexamethylene diisocyanate (HMDI), 1-isocyanate-3,3,5-trimethyl-5-isocyanatomethylcyclohexane (IPDI), bis-(isocyanatocyclohexyl)methane, etc. The ratio of hydroxyl groups provided by the polyol to hydroxyl-reactive groups of the polyisocyanate is typically about 0.5 to about 5, preferably about 0.9 to about 2.

The coating compositions of the current invention can further comprise other components and additives conventionally present in coating compositions, for non-limiting example, pigments, coloring agents, pigment dispersing agents, thixotropic and other rheological agents, accelerators (e.g., tin catalysts, p-toluene sulfonic acid and blocked derivatives thereof, etc.).

The coating compositions can be applied to any substrate; that is, wood, metal, plastic and other synthetic materials, etc. Further, the aqueous dispersions of the instant invention can be employed in all types of coating compositions particularly, paints. They are especially useful as clear coats and pigmented top coats for metal surfaces (particularly automotive and transportation vehicle coatings and more particularly refinishing). These applications make use of the fact that the current invention provides stable, aqueous coating compositions (typically "paints") which, when cured, provide high quality coatings. These coatings have high aesthetic qualities (e.g. high gloss (>70 at 200) and lack of haziness) without sacrificing technical characteristics, such as hardness, solvent resistance and water resistance. They are thus particularly suitable for coatings that are "finishes"; that is, visible coatings that must provide aesthetic appeal, such as clear coats and pigmented top coats on vehicles, appliances, etc. and indeed, any consumer product.

Any known methods for applying coating compositions can also be used. Non-limiting examples of such application methods are spreading (e.g. brushing, rolling, by paint pad or doctor blade), spraying (e.g., airfed spray, airless spray, hot spray and electrostatic spray), flow coating (e.g. dipping, curtain coating, roller coating and reverse roller coating) and electrodeposition. (See generally, *Paint and Surface Coatings: Theory and Practice*, R. Lambourne, Editor, Ellis Horwood, 1987, page 39 et seq.) Coating compositions of the instant invention can be formulated to accommodate drying and curing at ambient temperature and elevated temperature (e.g. about 60° C. to about 160° C.).

In addition to being used as the binder or resin component in a coating composition, the polymers of the current invention can also be employed in aqueous systems, particularly coating compositions, as a polymeric emulsifying agent or dispersing agent for other polymers in the aqueous system, especially those which do not have sulfonate and/or nonionic groups. The other polymer present in the aqueous system is typically a polyol, for non-limiting example, polyester polyol, polyepoxyester polyol, polyether polyol, polyurethane polyol, polyacrylate polyol, etc. and mixtures thereof. However, the polymers of the current invention can also be used as an emulsifying and/or dispersing agent for other polymers, such as alkyds. Polymers of the current invention can also be used as a dispersing agent for pigments.

The invention is further described and illustrated by the examples which follow.

EXAMPLES

In the Examples which follow, the compositions listed below are available as indicated.

i. 1-Methoxy propanol-2 is available as "Dowanol PM" from Dow Chemicals, Midland, Mich.

ii. T-butyl peroxy-2-ethyl hexanoate is available as "Trigonox® 21S from Akzo Nobel Chemicals, Amersfoort, the Netherlands.

In the Examples which follow, the commercial products listed below have the compositions indicated and are available from the suppliers named.

i. Cardura® E-10, the glycidyl ester of Verstic acid, is available from either Shell Chemical Corporation, Houston, Tex.

ii. Jeffamine® M-1000, a polyether amine having an EO/PO ratio of approximately 19/3 and an Mn of about 1100, is available from Huntsman Corporation, Zaventem, Belgium.

Preparation of Polymers and Aqueous Dispersions

Reaction Product A

Low MW Unsaturated Polyester A

The components listed below were weighed into a 3-neck 6-liter round-bottom flask fitted with a stirrer, a thermometer, a Dean- Stark apparatus and a reflux condenser.

| | |
|---|---|
| trimethylol propane | 1608.00 parts |
| itaconic acid | 104.00 parts |
| isononanoic acid | 1264.00 parts |
| hexahydrophthalic anhydride | 1108.80 parts |
| o-phosphoric acid catalyst | 1.00 part |
| o-xylene | 200.00 parts |

After the Dean-Stark apparatus was filled with o-xylene, the reaction flask was evacuated and the air replaced with nitrogen. This procedure was repeated twice. The contents of the flask were heated until the formed water was trapped by the Dean-Stark apparatus (azeotropic distillation with xylene). The temperature was increased gradually to 250° C. and the water collected. After 15 hours, 315 parts of water were collected. The reaction product had an acid value of 1.05 mg KOH/g. The reactor was cooled to 180° C. and the xylene and remaining water removed at reduced pressure by distillation. The end product had an acid value of 0.83 mg KOH/g.

The polyester was cooled to 120° C. and diluted with 418 parts 1-methoxy propanol-2 to a solids content of 90% by weight. The polyester solution was then cooled to room temperature.

Reaction Product B

Adduct of Sodium Taurine and Glycidyl Ester of Versatic Acid

The components listed below were weighed into a 3-neck 2-liter round-bottom flask fitted with a stirrer, a thermometer, a dropping funnel and a reflux condenser.

| | |
|---|---|
| taurine (2-aminoethane sulfonic acid) | 187.50 parts |
| sodium hydroxide | 60.00 parts |
| demineralized water | 149.00 parts |
| 1-methoxy propanol-2 | 704.00 parts |

The dropping funnel was filled with 450 parts Cardura® E-10 glycidyl ester. After a vacuum/nitrogen flushing procedure (3 times) the reactor was heated to 100° C.

The Cardura E-10 glycidyl ester was added in 2 hrs. to the reactor while the contents of the reactor were stirred. The system was initially heterogeneous, but after circa 35 minutes a homogeneous solution was obtained. Post-reaction conditions were continued until the conversion of the Cardura E-10 glycidyl ester was complete (5-10 minutes after the end of the dosage).

The water was removed by distillation under reduced pressure. The maximum temperature of the solution was 105° C. and the lowest pressure circa 15 mm Hg.

Enough 1-methoxy propanol-2 was added to obtain a product with a solids content of 66.5 wt. %. The product was easily handled at room temperature.

Reaction Product C

Adduct of Polyether Amine and Glycidyl Ester of Versatic Acid

Eight hundred (800) parts Jeffamine M-1000 polyether amine were weighed into a 3-neck 2-liter round-bottom flask fitted with a stirrer, a thermometer, a dropping funnel and a reflux condenser.

The dropping funnel was filled with 200 parts Cardura E-10 glycidyl ester. After a vacuum/nitrogen flushing procedure (3 times) the reactor was heated to 120° C. and the Cardura E-10 glycidyl ester was added. The reaction was continued until the conversion of the Cardura E-10 glycidyl ester was complete. The reaction product was cooled to 60° C. and stored at room temperature.

Reaction Product D

Low MW Unsaturated Polyester D

Reaction Product D is identical to Reaction Product A except it has a solids content of 68.3 wt. %.

Reaction Product E

Low MW Unsaturated Polyester E

Reaction Product E is identical to Reaction Product A except it has a solids content of 87 wt. %.

Reaction Product F

Acrylic Polymer

Three hundred fifty (350.0) parts 1-methoxy propanol-2 were weighed into a 3-neck 2-liter round-bottom flask fitted with a stirrer, a thermometer, two dropping funnels and a reflux condenser.

Dropping Funnel A was filled with a homogeneous mixture of the following components:

| | |
|---|---|
| 2-hydroxyethyl methacrylate | 447.23 parts |
| butyl acrylate | 314.20 parts |
| methyl methacrylate | 490.45 parts |
| gylcidyl methacrylate | 190.31 parts |

Dropping Funnel B was filled with a homogeneous mixture of the following components:

| | |
|---|---|
| t-butyl peroxy-2-ethyl hexanoate | 57.59 parts |
| 1-methoxy propanol-2 | 25.00 parts |

The flask was evacuated and the air replaced with nitrogen three (3) times. The contents of the flask were heated to reflux and contents of the funnels were added according to the scheme detailed below.

| Time (hrs) | Remarks |
|---|---|
| 0 | start Dropping Funnels A and B |
| 3 | stop Dropping Funnel A, continue B |
| 4 | stop Dropping Funnel B |

After the addition of Dropping Funnel B was completed, the temperature was kept at reflux (approximately 125° C.) for another 2 hours. The polymer solution was then allowed to cool to room temperature.

EXAMPLE 1

Sulfonate Stabilization

The following component was weighed into a 3-neck 2-liter round-bottom flask fitted with a stirrer, a thermometer, three dropping funnels and a reflux condenser.

| | |
|---|---|
| Reaction Product A | 311.11 parts |

Dropping Funnel A was filled with a homogeneous mixture of the following components:

| | |
|---|---|
| 2-hydroxy ethyl methacrylate | 53.23 parts |
| butyl acrylate | 41.21 parts |
| methyl methacrylate | 77.26 parts |
| dodecyl mercaptan | 3.43 parts |

Dropping Funnel B was filled with a homogeneous mixture of the following components:

| | |
|---|---|
| 2-hydroxy ethyl methacryalte | 63.20 parts |
| butyl acrylate | 45.88 parts |
| methyl methacrylate | 81.07 parts |
| glycidyl methacrylate | 13.70 parts |
| dodecyl mercaptan | 4.08 parts |
| 1-methoxy propanol-2 | 14.75 parts |

Dropping Funnel C was filled with a homogeneous mixture of the following components:

| | |
|---|---|
| t-butyl peroxy-2-ethyl hexanoate | 15.03 parts |
| 1-methoxy propanol-2 | 25.00 parts |

After a vacuum/nitrogen flushing procedure (3 times) the contents of the reactor were heated to 120° C. and the contents of the dropping funnels were added according the scheme detailed below.

| Time (hrs) | Remarks |
|---|---|
| 0 | start Dropping Funnels A and C |
| 1.5 | stop Dropping Funnel A, start B and continue C |
| 3.0 | stop Dropping Funnel B, continue C |
| 4.0 | stop Dropping Funnel C |

After the addition of Dropping Funnel C was completed, the temperature was kept at 120° C. for another 2 hours.

Dropping Funnel D was filled with 32.93 parts Reaction Product B.

Dropping Funnel D was fitted on the reactor and its contents added over a 15 minute period. After completion the contents of the reactor were heated to 140° C.

After 4 hours the contents of the reactor were cooled to less than 100° C. and 490.85 parts demineralized water were added gradually (circa 3 hours) to the reactor. The temperature of the contents of the reactor was maintained at 60° C.

The end product, a fine waterborne dispersion, was cooled to room temperature. The solids content was 55% by weight and the average particle size 247 nm (measured with QELS: Quasi Elastic Light Scattering). The dispersion was still stable after 4 weeks at 35° C.

Example 2

Sodium Sulfonate and Nonionic Stabilization

Reaction Product A (311.11 parts) was weighed into a 3-neck 2-liter round-bottom flask fitted with a stirrer, a thermometer, three dropping funnels and a reflux condenser.

Dropping Funnel A was filled with a homogeneous mixture of the following components:

| | |
|---|---|
| 2-hydroxy ethyl methacrylate | 53.23 parts |
| butyl acrylate | 41.21 parts |
| methyl methacrylate | 77.26 parts |
| dodecyl mercaptan | 3.43 parts |

Dropping Funnel B was filled with a homogeneous mixture of the following components:

| | |
|---|---|
| 2-hydroxy ethyl methacrylate | 60.65 parts |
| butyl acrylate | 46.66 parts |
| methyl methacrylate | 72.37 parts |
| glycidyl methacrylate | 15.93 parts |

-continued

| | |
|---|---|
| dodecyl mercaptan | 3.92 parts |
| 1-methoxy propanol-2 | 14.75 parts |

Dropping Funnel C was filled with a homogeneous mixture of the following components:

| | |
|---|---|
| t-butylxperoxy-2-ethyl hexanoate | 14.69 parts |
| 1-methoxy propanol-2 | 25.00 parts |

After a vacuum/nitrogen flushing procedure (3 times) the reactor was heated to 120° C. and the contents of the dropping funnels were added according the following scheme:

| Time (hrs) | Remarks |
|---|---|
| 0 | start Dropping Funnels A and C |
| 1.5 | stop Dropping Funnel A, start B and continue C |
| 3.0 | stop Dropping Funnel B, continue C |
| 4.0 | stop Dropping Funnel C |

After the addition of Dropping Funnel C was completed, the temperature was kept at 120° C. for another 2 hours.

Dropping Funnel D was filled with a warm, homogeneous mixture of the following components:

| | |
|---|---|
| Reaction Product B | 32.93 parts |
| Reaction Product C | 8.75 parts |

Dropping Funnel D was fitted on the reactor and its contents added over a 15 minute period. After completion of the addition, the contents of the reactor were heated to 140° C.

After 4 hours the contents of the reactor were cooled to below 100° C. and 618.09 parts demineralized water were added gradually (circa 3 hours) to the reactor. The temperature of the contents of the reactor was maintained at 60° C. The end product, a fine waterborne dispersion, was cooled to room temperature. The solids content was 50% by weight and the average particle size 186 nm (measured with QELS: Quasi Elastic Light Scattering). The dispersion was still stable after 4 weeks at 35° C.

Example 3

Sulphonate Stabilization

Reaction Product A (311.11 parts) was weighed into a 3-neck 2-liter round-bottom flask fitted with a stirrer, a thermometer, three dropping funnels and a reflux condenser.

Dropping Funnel A was filled with a homogeneous mixture of the following components:

| | |
|---|---|
| 2-hydroxy ethyl methacrylate | 53.23 parts |
| butyl acrylate | 41.22 parts |

-continued

| | |
|---|---|
| methyl methacrylate | 77.26 parts |
| dodecyl mercaptan | 3.43 parts |

Dropping Funnel B was filled with a homogeneous mixture of the following components:

| | |
|---|---|
| 2-hydroxy ethyl methacrylate | 61.85 parts |
| butyl acrylate | 47.25 parts |
| methyl methacrylate | 73.38 parts |
| glycidyl methacrylate | 16.95 parts |
| dodecyl mercaptan | 3.99 parts |
| 1-methoxypropanol-2 | 12.55 parts |

Dropping Funnel C was filled with a homogeneous mixture of the following components:

| | |
|---|---|
| t-butyl peroxy-2-ethyl hexanoate | 14.85 parts |
| 1-methoxy propanol-2 | 25.00 parts |

After a vacuum/nitrogen flushing procedure (3 times) the contents of the reactor were heated to 120° C. and the contents of the dropping funnels was added according the scheme described in Example 2.

After the addition of Dropping Funnel C, the temperature was kept at 120° C. for another 2 hours.

Dropping Funnel D was filled with 38.95 parts Reaction Product B.

Dropping Funnel D was fitted on the reactor and its contents added over a 15 minute period. After completion of the addition, the contents of the reactor were heated to 140° C.

After 4 hours the contents of the reactor were cooled to below 100° C. and 619.00 parts demineralized water were added gradually (circa 3 hours) to the reactor. The temperature of the contents of the reactor was maintained at 60° C.

The end product, a fine waterborne dispersion, was cooled to room temperature. The solids content was 50% by weight and the average particle size 153 nm (measured with QELS: Quasi Elastic Light Scattering). The dispersion was still stable after 4 weeks at 35° C.

Example 4

External Emulsifier

Five hundred (500) parts Reaction Product F were weighed into a 3-neck 2-liter round-bottom flask fitted with a stirrer, a thermometer, two dropping funnels and a reflux condenser.

Dropping Funnel A was filled with 16.90 Reaction Product C and Dropping Funnel B was filled with 61.86 parts Reaction Product D.

The reactor was evacuated then nitrogen-flushed three times. The reaction was heated to reflux (about 126° C.) and the contents of the dropping funnels were added according to the following scheme.

| Time (hrs.min) | Remarks |
|---|---|
| 0.00 | start Dropping Funnel A |
| 0.10 | stop Dropping Funnel A |
| 2.10 | start Dropping Funnel B |
| 2.20 | stop Dropping Funnel B |

After addition of Dropping Funnel B was completed, the temperature was kept at reflux (about 123°) for another 3 hours. The emulsifier solution was then allowed to cool to room temperature.

Example 5

Polyol Dispersion Having External Emulsifier

The following components were weighed into a flask fitted with a stirrer, a thermometer and a reflux condenser. (The "high solids polyester polyol solution" had a solids content of 90 wt. % in 1-methoxy propanol-2, a calculated MW of 1200 and an OH number of 160 mg KOH/g solids.)

| | | |
|---|---|---|
| External Emulsifier from Example 4 | 300.01 | parts |
| high solids polyester polyol solution | 513.33 | parts |

The contents of the reactor were heated to 80° C. under good mixing. Over a period of approximately 3 hours, 615.26 parts demineralized water were added. During water addition, the reactor was gradually cooled to 60° C. then held at that temperature for the remainder of the water addition.

The end product, a fine waterborne dispersion, was cooled to room temperature. The solids content was 49% by weight and the average particle size 288 nm (measured with QELS: Quasi Elastic Light Scattering). The OH number of the dispersion was 152.7 mg KOH/g solids. The dispersion was still stable after 4 weeks at 35° C.

Comparative Example 6

Carboxylate Stabilization with Amine Neutralization

Reaction Product E (275.90 parts) was weighed into the flask of an apparatus configuration of the type described in Example 1.

Dropping Funnel A was filled with a homogeneous mixture of the following components.

| | | |
|---|---|---|
| 2-hydroxyethyl methacrylate | 44.57 | parts |
| butyl acrylate | 35.66 | parts |
| methyl methacrylate | 68.34 | parts |
| dodecyl mercaptan | 2.97 | parts |

Dropping Funnel B was filled with a homogeneous mixture of the following components.

| | | |
|---|---|---|
| 2-hydroxyethyl methacrylate | 58.29 | parts |
| butyl acrylate | 60.61 | parts |
| methyl methacrylate | 53.43 | parts |
| methacrylic acid | 1.96 | parts |
| dodecyl mercaptan | 3.88 | parts |
| 1-methoxy propanol-2 | 9.50 | parts |

Dropping Funnel C was filled with a homogeneous mixture of the following components.

| | | |
|---|---|---|
| t-butyl peroxy-2-ethylhexanoate | 10.30 | parts |
| 1-methyloxy propanol-2 | 25.00 | parts |

The reactor was evacuated and flushed with nitrogen three (3) times. The contents of the reactor were heated to 120° C. The contents of the dropping funnels were added according to the scheme described in Example 2. After addition of the contents of Dropping Funnel C the temperature was held at 120° C. for another 2 hours. The contents of the reactor were then cooled to 108° C.

Dropping Funnel D was filled with 17.02 parts N,N-dimethylethanol amine. It was fitted on the reactor and the contents were added over a period of 15 minutes. The contents of the reactor were cooled to about 100° C. and 747.50 parts demineralized water were added gradually (about 3 hours) to the reactor. During water addition the reactor contents were allowed to cool to 80° C., and then held at that temperature.

The end product, a fine waterborne dispersion, was cooled to room temperature. The solids content was 43 wt. % and the average particle size 150 nm (measured with QELS: Quasi Elastic light Scattering). The OH number of the dispersion was 145 mg KOH/g solids (corrected for the OH originating from N,N-dimethylethanol amine: 158 KOH/g).

Comparative Example 7

Carboxylate Stabilization with NaOH Neutralization

Reaction Product E (275.90 parts) was weighed into the flask of an apparatus configuration of the type described in Example 1.

Dropping Funnel A was filled with a homogeneous mixture of the following components.

| | | |
|---|---|---|
| 2-hydroxy ethyl methacrylate | 44.57 | parts |
| butyl acrylate | 35.66 | parts |
| methyl methacrylate | 68.34 | parts |
| dodecyl mercaptan | 2.97 | parts |

Dropping Funnel B was filled with a homogeneous mixture of the following components.

| | | |
|---|---|---|
| 2-hydroxy ethyl methacrylate | 58.29 | parts |
| butyl acrylate | 60.61 | parts |
| methyl methacrylate | 53.43 | parts |
| methacrylic acid | 21.96 | parts |
| dodecyl mercaptan | 3.88 | parts |
| 1-methoxy propanol-2 | 9.50 | parts |

Dropping Funnel C was filled with a homogeneous mixture of the following components:

| | | |
|---|---|---|
| t-butyl peroxy-2-ethyl hexanoate | 10.30 | parts |
| 1-methyloxy propanol-2 | 25.00 | parts |

The reactor was evacuated and flushed with nitrogen three (3) times. The contents of the reactor were heated to 120° C. The contents of the dropping funnels were added according to the scheme described in Example 2. After addition of the contents of Dropping Funnel C the temperature was held at 120° C. for another 2 hours. The contents of the reactor were then cooled to 105° C.

Dropping Funnel D was filled with a homogeneous solution of 7.65 parts sodium hydroxide and 12 parts demineralized water. It was fitted on the reactor and the contents were added over a period of 15 minutes. The contents of the reactor were cooled to about 100° C. and 698.58 parts demineralized water were added gradually (about 3 hours) to the reactor. During water addition the reactor contents were allowed to cool to 80° C., and then held at that temperature.

The end product, a fine waterborne dispersion, was cooled to room temperature. The solids content was 43 wt. % and the average particle size 206 nm (measured with QELS: Quasi Elastic Light Scattering). The OH number of the dispersion was 143 mg KOH/g solids.

Preparation of Coating Compositions and Films

In the following Examples 8–13, unpigmented coating compositions in accordance with the present invention were prepared by homogeneously mixing the dispersion, the polyisocyanate, and methoxypropanol acetate, commercially available as Dowanol PMA from Dow, Midland, Mich. Demineralized water was added as needed to adjust for application viscosity (between about 0.5 and about 1.0 Pa-sec).

The polyisocyanate used in Examples 8–13 is the polyisocyanate resin commercially available as Bayhydur LS 2032 from Bayer, Leverkussen, Germany. It was diluted before mixing with methoxypropanol acetate to 80% solids contents.

The coating compositions of Examples 8–13 were applied to a zinc phosphate pretreated steel panel (Bonder 26 60 OC) and cured at room temperature. The hardness, gloss, organic solvent resistance and water resistance were measured after 1 week curing. Organic solvent resistance and water resistance were also measured after 2 days curing.

The Persoz hardness was determined in accordance with French industrial standard NF T30-016, and the results are expressed in seconds. An acceptable minimum for automotive and car refinish coating is about 180 seconds.

The gloss of the coating was determined in accordance with U.S. industrial standard ASTM D-523 at 60° and 20°. A gloss value on a steel substrate of above 80 at 60° and of above 70 at 20° is considered high.

Tests

Water resistance was tested by putting a piece of water-soaked cottonwool on the coating. After one hour the wet cotton-wool was removed and the panel was wiped dry. Appearance was noted. The scratch resistance was tested by rubbing the treated area with a finger nail. Test results are reported on a scale from 0 to 10, where 0 is very bad and 10 is very good. An acceptable minimum is generally considered to be 8.

The solvent resistance to gasoline and methyl ethyl ketone was tested. The test was similar to the water resistance test, but the cotton-wool was removed after 1 minute instead of 1 hour. An acceptable minimum for gasoline resistance is generally considered to be 8 and for methyl ethyl ketone resistance 5.

Tests for both water resistance and solvent resistance were carried out after two days and after one week.

Example 8

The following components were added sequentially to 90.9 parts by wt. (pbw) of the dispersion from Example 1.

| | |
|---|---|
| 15.0 | pbw methoxy propanol acetate |
| 61.6 | pbw Bayhydur LS 2032 solution in methoxypropanol acetate (solids content = 80%) |

The resulting coating composition was diluted with demineralized water to application viscosity.

A doctor blade was used to coat (100–200 µm thick, wet) a Bonder 26 60 OC steel panel with the coating composition. After 1 week curing at room temperature the resulting film had a Persoz hardness of 253 seconds and showed high gloss (>75 at 20° and >85 at 60°). The solvent and water resistance test results are reported in Table I.

The coating composition was also applied as a top coat to both a waterborne basecoat and a solvent borne base coat, available commercially, respectively as Autowave® basecoat and Autobase® basecoat, Akzo Nobel Coatings, Sassenheim, the Netherlands.

The resulting test panels had a good metallic appearance and high gloss after cure.

Example 9

The following components were added sequentially to 104.2 parts by wt. (pbw) of the dispersion from Example 2.

| | |
|---|---|
| 14.9 | pbw methoxy propanol acetate |
| 61.3 | pbw Bayhydur LS 2032 solution in methoxypropanol acetate (solids content = 80%) |

The resulting coating composition was diluted with demineralized water to application viscosity.

A doctor blade was used to coat (100–200 µm thick, wet) a Bonder 26 60 OC steel panel with the coating composition. After 1 week curing at room temperature the resulting film had a Persoz hardness of 230 seconds and showed high gloss (>75 at 200 and >85 at 60°). The solvent and water resistance test results are reported in Table I.

The coating composition was also applied as a top coat to both a waterborne basecoat and a solvent borne basecoat, available commercially, respectively as Autowave® basecoat and Autobase® basecoat, Akzo Nobel Coatings, Sassenheim, the Netherlands.

The resulting test panels had a good metallic appearance and high gloss after cure.

Example 10

The following components were added sequentially to 100.0 parts by wt. (pbw) of the dispersion from Example 3.

| | |
|---|---|
| 15.0 | pbw methoxy propanol acetate |
| 61.8 | pbw Bayhydur LS 2032 solution in methoxypropanol acetate (solids content is 80%) |

The resulting coating composition was diluted with demineralized water to application viscosity.

A doctor blade was used to coat (100–200 μm thick, wet) a Bonder 26 60 OC steel panel with the coating composition. After 1 week curing at room temperature the resulting film had a Persoz hardness of 255 seconds and showed high gloss (>75 at 200 and >85 at 60°). The solvent and water resistance test results are reported in Table I.

The coating composition was also applied as a top coat to both a waterborne basecoat and a solvent borne base coat, available commercially, respectively as Autowave® basecoat and Autobase® basecoat, Akzo Nobel Coatings, Sassenheim, the Netherlands.

The resulting test panels had a good metallic appearance and high gloss after cure.

Example 11

The following components were added sequentially to 102 parts by wt. (pbw) of the dispersion from Example 5.

| | |
|---|---|
| 12.6 | pbw methoxy propanol acetate |
| 60.8 | pbw Bayhydur LS 2032 solution in methoxypropanol acetate (solids content = 80%) |

The resulting coating composition was diluted with demineralized water to application viscosity. A doctor blade was used to coat (100–200 μm thick, wet) a Bonder 26 60 OC steel panel with the coating composition. After 1 week curing at room temperature the resulting film had a Persoz hardness of 269 seconds and showed high gloss (>75 at 20° and >85 at 60°). The solvent and water resistance test results are reported in Table I.

The coating composition was also applied as a top coat to both a waterborne basecoat and a solvent borne basecoat, available commercially, respectively as Autowave® basecoat and Autobase® basecoat, Akzo Nobel Coatings, Sassenheim, the Netherlands.

The resulting test panels had a good metallic appearance and high gloss after cure.

Example 12

Comparative Example

The following components were added sequentially to 100.0 parts by wt. (pbw) of the dispersion from Example 6.

| | |
|---|---|
| 13.0 | pbw methoxy propanol acetate |
| 55.4 | pbw Bayhydur LS 2032 solution in methoxypropanol acetate (solids content = 80%) |

The resulting coating composition was diluted with demineralized water to application viscosity.

A doctor blade was used to coat (100–200 μm thick, wet) a Bonder 26 60 OC steel panel with the coating composition. After 1 week curing at room temperature the resulting film had a Persoz hardness of 250 seconds and showed high gloss (>75 at 20° and >85 at 60°). The solvent and water resistance test results are reported in Table I.

The coating composition was also applied as a top coat to both a waterborne basecoat and a solvent borne basecoat, available commercially, respectively as Autowave® basecoat and Autobase® basecoat, Akzo Nobel Coatings, Sassenheim, the Netherlands. The gloss of both panels was unacceptable due to foam formation in the top coat.

Example 13

Comparative Example

The following components were added sequentially to 100.0 parts by wt. (pbw) of the dispersion from Example 7.

| | |
|---|---|
| 12.6 | pbw methoxy propanol acetate |
| 50.1 | pbw Bayhydur LS 2032 solution in methoxypropanol acetate (solids content = 80%) |

The resulting coating composition was diluted with demineralized water to application viscosity.

A doctor blade was used to coat (100–200 μm thick, wet) a Bonder 26 60 OC steel panel with the coating composition. Solvent and water resistance test results are reported in Table I.

After one week curing at room temperature the film was hazy. Testing was stopped.

TABLE I

| | Resistance Tests (after 2 days/1 week) | | |
|---|---|---|---|
| Example | Water | Gasoline | Methyl ethyl ketone |
| 8 | 9/10 | 10 | 7/8 |
| 9 | 9/10 | 10 | 7/8 |
| 10 | 9/10 | 10 | 7/8 |
| 11 | 9/10 | 10 | 7/8 |
| 12 (comparative) | 9/9 | 9/9 | 7/8 |
| 13 (comparative) | 5 (*)/7 (**) | 9/9 | 7/8 |

(*) white spot and loss of adhesion on steel
(**) loss of adhesion on steel

What is claimed is:

1. An aqueous coating composition comprising a water-dissipatable polymer comprising a lipophilic polymer polyol having pendant sulfonic acid salt groups and a polyisocyanate curing agent, characterized in that said pendant sulfonic acid salt groups are of the following formula

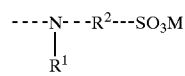

wherein
   $R^1$ is selected from the group consisting of (a) $C_1$ to $C_{20}$ alkyl or (b) the following formula

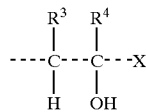

wherein $R^3$ and $R^4$ are, independently, selected from the group consisting of hydrogen and methyl, and X is the residue of a monoepoxy-containing compound, $R^2$ is selected from the group consisting of $C_1$ to $C_8$ alkylene and M is a cation, said sulfonic acid salt groups present in an amount sufficient to render said lipophilic polymer polyol water-dissipatable.

2. An aqueous coating composition according to claim 1 wherein the lipophilic polymer polyol is an addition polymer polyol.

3. An aqueous coating composition according to claim 2 wherein the number average molecular weight Mn of the addition polymer polyol is 1000 to 50,000, the OH number is 20 to 300, the concentration of sulfonic acid salt groups is 0.01 to 04 meq/g, and, if present, the pendant nonionic groups are 0.01 to 10 weight % of the addition polymer polyol.

4. An aqueous coating composition comprising an at least partially unsaturated polymer which has been grafted with an addition polymer polyol according to claim 2.

5. An aqueous coating composition according to claim 4 wherein the water-dissipatable polymer comprises 10 to 90 weight % of an at least partly unsaturated polymer having a number average molecular weight Mn of 300 to 3000, an OH number of 20 to 300 and an acid number less than 5 grafted with 90 to 10 weight % of an addition polymer polyol having a number average molecular weight Mn of 1000 to 50,000 and an OH number of 20 to 300.

6. An aqueous coating composition according to claim 1 wherein the water-dissipatable polymer has pendant nonionic groups.

7. An aqueous coating composition according to claim 6 wherein the pendant nonionic groups are alkoxy polyalkoxy alkylene groups.

8. An aqueous coating composition according to claim 7 wherein the alkoxy polyalkoxy alkylene groups comprise C1 to C4 alkoxy polyalkoxy alkylene groups.

9. An aqueous coating composition according to claim 1 wherein the polyisocyanates are water-dispersible isocyanates and blocked isocyanates.

10. An aqueous coating composition according to claim 9 wherein the water-dispersible isocyanates are selected from the group consisting of a tolylene diisocyanate (TDI), 4,4'-diphenylmethane diisocyanate (MDI), hexamethylene diisocyanate (HMDI), 1-isocyanate-3,3,5-trimethyl-5-isocyanatomethylcyclohexane (IPDI), or bis-(isocyanatocyclohexyl) methane.

11. An aqueous coating composition according to claim 9 wherein the ratio of hydroxyl groups provided by the polyol to hydroxyl-reactive groups of the polyisocyanate is from 0.5 to 5.

12. An aqueous coating composition according to claim 3 wherein the concentration of sulfonic acid salt groups is 0.07 to 0.25 meq/g.

13. An aqueous coating composition according to claim 3 wherein the pendant nonionic groups are 0.5 to 3 weight % of the addition polymer polyol.

14. An aqueous coating composition comprising a water-dissipatable polymer comprising a lipophilic polymer polyol having pendant sulfonic acid salt groups and a polyisocyanate curing agent, characterized in that said pendant sulfonic acid salt groups are of the following formula

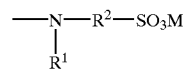

wherein, $R^1$ is hydrogen, $R^2$ is $C_2$ alkylene,

M is a cation, said sulfonic acid salt groups present in an amount sufficient to render said lipophilic polymer polyol water-dissipatable, and said pendant sulfonic acid salt groups being provided by monomers which are the reaction product of (a) free radically polymerizable monomers having an isocyanate group and (b) alkali metal taurinates.

15. An aqueous coating composition comprising a water-dissipatable polymer comprising a lipophilic polymer polyol having pendant sulfonic acid salt groups and a polyisocyanate curing agent, characterized in that said pendant sulfonic acid salt groups are of the following formula

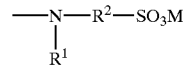

wherein, $R^1$ is selected from the group (a) hydrogen, (b) $C_1$ to $C_{20}$ alkyl, (c) the following formula

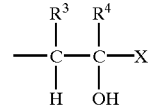

wherein $R^3$ and $R^4$ are independently selected from the group hydrogen and methyl, and X is the residue of a monoepoxy-containing compound, $R^2$ is selected from the group $C_1$ to $C_8$ alkylene, and M is cation, said sulfonic acid salt groups present in an amount sufficient to render said lipophilic polymer polyol water-dissipatable, the lipophilic polymer polyol being an addition polymer polyol, and the aqueous coating composition comprising an at least partially unsaturated polymer which has been grafted with the addition polymer polyol.

16. An aqueous coating composition comprising a water-dissipatable polymer comprising a lipophilic polymer polyol having pendant sulfonic acid salt groups and a polyisocyanate curing agent, characterized in that said pendant sulfonic acid salt groups are of the following formula

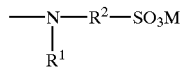

wherein,
$R^1$ is hydrogen,
$R^2$ is $C_2$ alkylene, and
M is a cation,
said sulfonic acid salt groups present in an amount sufficient to render said lipophilic polymer polyol water-dissipatable, and
said sulfonic acid salt groups provided by amino ethane sulfonic acid salts.

* * * * *